United States Patent [19]

Murphy

[11] 3,765,925

[45] Oct. 16, 1973

[54] PROCESS OF PRODUCING A PERMEABLE SYNTHETIC FILM

[75] Inventor: Walter T. Murphy, Cuyahoga Falls, Ohio

[73] Assignee: The B. F. Goodrich, Company, New York, N.Y.

[22] Filed: Nov. 1, 1971

[21] Appl. No.: 194,526

[52] U.S. Cl............ 117/63, 117/135.5, 117/161 KP
[51] Int. Cl............................................... B44d 1/44
[58] Field of Search............ 117/161 KP, 63, 135.5; 260/859, 32.6 N, 30.4 N

[56] References Cited
UNITED STATES PATENTS

| | | | |
|---|---|---|---|
| 3,514,307 | 5/1970 | Hallenbeck | 117/8 |
| 3,100,721 | 8/1963 | Holden | 117/161 KP |
| 2,871,218 | 1/1959 | Schollenberger | 117/161 KP UX |

Primary Examiner—William D. Martin
Assistant Examiner—Theodore G. Davis
Attorney—Albert C. Doxsey et al.

[57] ABSTRACT

A poromeric film is provided which is based on a polymer cement of polyurethane, polyvinyl chloride, and plasticizer. No internal non-solvent is used. The cement is applied to a water permeable substrate and coagulated in a water bath.

2 Claims, No Drawings

PROCESS OF PRODUCING A PERMEABLE SYNTHETIC FILM

BACKGROUND OF THE INVENTION

The manufacture of poromeric permeable synthetic films suitable for shoe uppers by dissolving prepolymer polyurethanes in a solvent such as dimethyl formamide, spreading the cement on a substrate and coagulating by exposure to moist air, water or a mixture of water and polymer solvent is known. Generally internal water is required in the polymer cement to form colloidal dispersions or near colloidal dispersions. This feature in turn requires that coagulation baths of mixed solvent and water be used for best results. Process control in a plant is difficult.

The manufacture of poromeric films by dissolving essentially linear polyesterurethanes in dimethyl formamide in the presence of a thixotropic viscosity improver and sufficient internal water to produce a cement cloud point of 40° – 95°C is also known. The cement is spread on a substrate, given an air set of several minutes to precipitate polymer and washed in water to remove residual solvent. The elevated temperatures used in this process can lead to solvent loss and degradation of cement viscosity. Control of plant process conditions is difficult.

Other synthetic materials in the form of films are used for lower cost shoe uppers. Chief among these materials is polyvinyl chloride film which is formed as in a calendering or in a casting process. Polyvinylchloride film is inexpensive compared to polyurethane film and forms attractive shoe uppers. A polyvinyl chloride shoe upper of this type is, however, impermeable to air and water vapor. It is not poromeric in nature and shoes made with this type of upper are intolerably uncomfortable to many people, particularly when worn for a period of more than a few hours in succession.

Polyvinyl chloride materials have been made breatheable by punching holes in them, which leaves an unattractive film. Other efforts to make breatheable polyvinyl chloride films include adding fillers such as salt, walnut shells, water soluble powders and non-compatible liquids such as ethylene glycol to the cement, spreading the films, then washing the non-compatible component out with water or other elutant which is non-solvent for polyvinyl chloride. These processes are not widely practical because of huge quantities of water that are used and contaminated and the difficulty in obtaining complete removal of the non-compatible material.

The present invention is a specific combination of specific ingredients, all known in the prior art, but not heretofore taught in the specific combination shown herein. Even with this invention it has not been possible to make practical poromeric films based on polyvinyl chloride as the sole polymer, but it has become possible to make practical poromeric films wherein an essentially linear polyurethane containing substantially no free hydroxyl or isocyanate end groups is combined in a minor amount, based on weight of polymer plus plasticizer, with a major amount of combined polyvinyl chloride and plasticizer for such polyvinyl chloride. The prior art has taught that prepolymer polyurethanes chain extended with a compound having two active hydrogen atoms bounded to amino-nitrogen atoms can be combined with polyvinyl chloride to form cements for producing poromeric film, but has found that it is preferable to keep the proportion of polyvinyl chloride at 50% or less by weight of total polymer present whether or not any plasticizer was combined with the polyvinyl chloride. In U.S. Pat. No. 3,100,721 such mixtures are shown, but to produce a satisfactory poromeric material, polyvinyl-chloride is combined with the polyurethane in levels of 25 – 50 percent by weight. Further, the use of plasticizers with the polyvinyl chloride component is discouraged. The polymer mixture is dissolved in a solvent such as dimethyl formamide and enough of the non-solvent for the polymer, such as water (internal water) is added to form a colloidal dispersion before spreading the film upon a substrate.

United States Pat. No. 3,208,875 describes the preparation of poromeric films from polymer cements preferably containing in the cement an amount of fluid (internal water) which is a non-solvent for the polymer, said amount being up to, but less than, the amount required to bring about formation of a colloidal dispersion. This process further requires that the polymer film be coagulated in a bath of mixed solvent - non-solvent for the polymer with the solvent content of the bath preferably above 50 percent. The presence of internal water is to help against the formation of macrovoids in the coating and to speed the coagulation process. In practicing these teachings it has been observed that when dimethyl formamide polymer cement, containing as the polymeric portion either all polyvinyl chloride or polyvinyl chloride containing up to 50 parts plasticizer, is employed to produce a film-forming layer on a substrate and the polymer is coagulated in a bath of either pure water or mixed water - solvent, the resulting film is somewhat poromeric in nature, but, is too stiff and brittle at low levels of plasticizer, and when highly plasticized is too low in moisture vapor transmission to be adequate as a useful poromeric film. Poromeric films of the prior art depend greatly for their success upon the presence in the polymer cement of at least 50 percent by weight polyurethane when polyvinyl-chloride is present.

The present invention enables one to prepare poromeric films of mixed essentially linear polyesterurethane and polyvinyl chloride and raise the proportion of lower cost polyvinyl chloride plus plasticizer therefore to as high as 70 percent by weight based on polymer plus plasticizer present, permitting substantial cost reductions from the cost of polyesterurethane poromeric films. The compositions of the present invention have further advantages over compositions of the prior art. The major elements present are a particular polyvinyl-chloride, a particular essentially linear polyurethane, a particular plasticizer and a particular solvent. No internal water is needed to create colloidal solutions or dispersions of coating cements. No high temperature cloud point cements are needed, and no thixotropic thickening viscosity improvers are needed. The cements are made and spread at room temperature for wet thicknesses to about 60 mils. For wet thickness above 60 mils cements are spread at 50° – 75°C. No air set time is specially required to coagulate polymer but provision of an air set period has been found to give product with somewhat better cell structure and better absorptivity of toner dye when in the form of a poromeric film. The cement can be run directly to a bath containing water only. No solvent is required in combination with water in the bath. The extraction bath can be hot water — up to 45° to 75° C for rapid extraction of solvent.

SUMMARY OF THE INVENTION

The art has broadly shown combinations of polyvinyl chloride and polyurethane polymers for use in forming poromeric films. The use of plasticizers with polyvinyl chloride is known. For a leatherlike film to be successful as a commercially acceptable poromeric material, it must have a moisture vapor transmission (MVT) of at least 650 g/sq.m./24 hours. The test procedure of the Federal Specifications on Leather Methods of Sampling and Testing, KK-L-311A, method 8011 is followed to determine MVT. Further, the film must be able to perform at least 100,000 flexes on the Bally Flexometer at 35°F.

The particular polyvinyl chloride resin found useful in this invention is a high molecular weight homopolymer. Low molecular weight homopolymers and copolymers have been tried and found to give unsatisfactory permeable film formation when coagulated in water from dimethyl formamide cements. A polyvinyl chloride resin, inherent viscosity 0.95, specific viscosity 0.44, specific gravity 1.4, particle size 10 percent less than 75 – 130 microns, 90 percent less than 130 – 200 microns is preferred. Such resins are available on the market. They are free flowing powders of granules readily soluble in the hygroscopic solvent dimethyl formamide. Larger particle size ranges than those listed above are acceptable as long as the resin dissolves readily in dimethyl formamide. The cement recipes of this invention are based on 100 weight parts of polyvinyl chloride.

The particular essentially linear polyurethanes useful in this invention are essentially linear polyesterurethanes prepared by the processes of U.S. Pat. No. 2,871,218. These materials are characterized by being thermoplastic, extrudable to a film and substantially free of cross-links. They are soluble in dimethyl formamide and also may be formed into a film of desired thickness by spreading as a cement and evaporating the solvent. The polyesterurethane elastomers are prepared by heating a mixture comprising (1) one mol of an essentially linear hydroxyl terminated polyester of a saturated aliphatic glycol having from 4 to 10 carbon atoms and having hydroxyl groups on its terminal carbon atoms, and a material selected from the group consisting of a dicarboxylic acid of the formula HOOC—R—COOH where R is an alkylene radical containing from two to eight carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted isocyanate or hydroxyl groups in the reaction product. Polyesterurethane materials of this type are available from the B.F. Goodrich Chemical Company as Estane 5701 and 5707. They are in the form of granules and can be converted into film by milling and calendering or extruding or by deposition from a solvent cement. Films are extremely tough and resistant to scuffing, abrasion and cracking. In the recipes of the invention the polyurethane is present in an amount of 50 – 80 parts by weight per 100 parts polyvinyl chloride.

A wide variety of materials such as organic phosphates, low molecular weight polyesters and the like are known as plasticizers for polyvinyl chloride. As will be shown later, however, only one plasticizer appears to be effective in the composition of the invention. It is di-2-ethylhexyl azelate, a commercially available material. The plasticizer is employed in the range of 20 – 80 parts per 100 parts polyvinyl chloride.

N,N'-dimethylformamide is the preferred solvent for forming the polymer cements that are used herein to spread poromeric forming films. Equivalent solvents are N,N'-dimethyl acetamide and tetrahydrofuran. The amount of solvent employed is 500 – 1000 parts by weight per 100 parts polyvinyl chloride. This range of solvent results in cements having total solids of about 18 – 30 percent.

Generally a wet film thickness of 20 – 60 mils is spread in the practice of this invention. Cements of 18 – 21 percent total solids are preferred for this. These cements are spread at room temperature and are coagulated by immersion in a water bath at about 50°C.

When thicker films – 60 to 140 mils and higher in the wet state, are desired, cements in the total solids range 22 to 30 percent are preferred. These higher total solids cements are spread at 50° – 75°C and are coagulated in water baths at about 50°C.

The films can be formed on the substrate by any accepted coating technique, calendering, brushing, by a doctor knife apparatus, or by dipping.

In summary the cements of this invention conform to the following recipe:

| Material | Parts by Weight |
|---|---|
| Polyvinyl chloride | 100 |
| Di-2-ethylhexyl azelate | 20–80 |
| Linear Polyesterurethane | 50–80 |
| Solvent | 500–1000 |

DETAILED DESCRIPTION OF THE INVENTION

PREPARATION OF POLYESTERURETHANE

A linear polyurethane polymer is prepared by following the teaching of U.S. Pat. No. 2,871,218. First 1000 g. (1.0 mol) of hydroxyl poly (tetramethylene adipate) molecular weight 1000, hydroxyl number 112, acid number 2.5, and 180 g. (2.0 mols) of butanediol-1,4 are mixed in a heated autoclave with stirring for 15 minutes at 10 mm. pressure at 1000° – 105°C. Next 750 g. (3.0 mols) of diphenylmethane-p,p'-diisocyanate are added and stirred for 2 minutes. The melt is poured into lubricated metal trays and held in an oven at 140° C. for 3 hours.

EXAMPLE 1

In this Example dimethyl formamide cements of various polymer compositions are made to the recipes below. The respective components are added to the solvent and dissolve with heating under continued agitation. The cements are of a viscosity to spread easily at room temperature on a substrate without being runny or too thick to spread uniformly. The substrate employed here is an open weave, water permeable, Teflon coated glass fiber fabric supplied by Dodge Industries Fluorglas Division Hoosick Falls, New York, Code XM 354-7520. The coating does not adhere strongly to this substrate. Polymers are coagulated from the cements by immersion of the coated substrate in a water bath at 50°C; the films are stripped from the substrate and evaluated for Bally flex, MVT, and appearance under a microscope at 30X magnification.

Repeat trials according to recipes H, I, J, K and L, using 20, 40, 80 parts of each of the respective plasticizers in place of 60 parts shown above, gave films that ranked about the same in flex and MVT regardless of the amount of plasticizer.

EXAMPLE 3

| Materials | A | B | C | D | E | F | G |
|---|---|---|---|---|---|---|---|
| Polyvinyl chloride | 100 | 80 | 100 | | 100 | 100 | |
| Di-2-ethylhexylazelate | | 20 | | 20 | 60 | 60 | |
| Polyester urethane | | 20 | | 100 | 60 | 60 | 100 |
| Dimethyl formamide | 732 | 646 | 300 | 300 | 913 | 660 | 300 |
| Bally flex at 35° F., number of flexes | 100 | 100 | 1,000 | 1,000,000 | 446,000 | 500,000 | 70,000 |
| MVT (g./sq. m./24 hrs.) | 35 | 410 | 55 | 130 | 925 | 695 | 340 |
| Surface appearance | Rough | Rough | Very rough | Smooth | Very smooth | Very smooth | Rough |
| Cross section (cell structure at 30X) | Non-uniform | Non-uniform | | Very dense, uniform | Uniform | Uniform | Non-uniform |
| General comment | Stiff, brittle, partial collapse of cells | Stiff, brittle, porous | Collapsed, nonporous | Partial collapse, bleeding of plasticizer | Flexible, porous, dry (no bleeding) | Flexible, porous, dry | Flexible, collapsed cells |

Polyvinyl chloride alone (Run A), as expected from prior art, forms a film that is too stiff to flex in a shoe material, either upper or lining, and which is almost impermeable. Combining some polyurethane with polyvinyl chloride, as has been suggested broadly in the art, Run B, gives a film that is porous and has some permeability, but is too stiff for shoe use. It is known to add plasticizer to polyvinylchloride to improve the flexibility of films thereof as in Run C. This film has collapsed to a virtually impermeable state and is nonporous. Addition of a plasticizer to polyurethane polymer, Run D, provides a film that has low permeability and shows plasticizer bleeding. Run G, a polyurethane film with no plasticizer gives a film which collapses to a rough surface and has both low permeability and low flex life. Runs E and F, the compositions of the invention surprisingly show an excellent balance of film properties. Neither polyvinyl chloride nor polyesterurethane alone gives a film adequate in permeability. These separate materials still gave films that were inadequate even with plasticizer added. Only the mixture of polymers plus a proper amount of plasticizer gives adequate balance of properties.

EXAMPLE 2

A series of cements similar to Run E of Example 1, but employing a variety of plasticizer, is made into films and evaluated by the procedures shown in Example 1.

Run D of Example 1 was repeated using a range of di-2-ethyl hexyl azelate.

| Material | M | N | O | P | Q |
|---|---|---|---|---|---|
| Polyvinyl chloride | 100 | 100 | 100 | 100 | 100 |
| Polyesterurethane | 60 | 60 | 60 | 60 | 60 |
| Di-2-ethyl hexyl azelate | 0 | 20 | 40 | 60 | 80 |
| Dimethyl formamide | 912 | 912 | 912 | 912 | 912 |
| Bally flex at 35°F, in thousands | 10 | 26 | 57 | 446 | 213 |
| MVT | 1090 | 978 | 973 | 925 | 831 |
| Percent Permanent Set (1 min. at 50% E., 1 min. relax) | 38 | 15 | 8 | 6 | 5 |

MVT is uniformly at a high level, 35°F. flex life increases as amount of plasticizer increases. There is a corresponding decrease in permanent set noted as plasticizer increases.

I claim:

1. The method of preparing a poromeric film comprising coating a cement, said cement comprising in parts by weight polyvinylchloride, high molecular weight homopolymer, sp. viscosity 0.44, inherent viscosity 0.95, specific gravity 1.4, particle size 90 percent less than 130–200 microns — 100 di-2-ethyl hexyl azelate — 20 - 80 linear polyesterurethane, essentially linear polyesterurethane having essentially no unreacted isocyanate or hydroxyl groups — 55 - 60

| Material | H | I | J | K | L |
|---|---|---|---|---|---|
| Polyvinyl chloride | 100 | 100 | 100 | 100 | 100 |
| Polyesterurethane | 60 | 60 | 60 | 60 | 60 |
| Epoxidized polyester of intermediate mol. wt. | 60 | | | | |
| Epoxidized triglycerides, polyglycol adipate and soya oil containing lecithin, xylene, and 1,1,1-trichloroethane | | 60 | | | |
| Dioctyl phthlate | | | 60 | | |
| Tricresyl phosphate | | | | 60 | |
| Tri 2-ethyl hexyl trimellitate | | | | | 60 |
| Dimethyl formamide | 900 | 900 | 900 | 900 | 900 |
| Bally flex at 35° F | 10,000 | 3,200 | 65,000 | 5,000 | 12,000 |
| MVT | 946 | 563 | 689 | 326 | 928 |
| Surface | Smooth | Slightly rough | Slightly rough | Slightly rough | Slightly rough |
| Cross section (30X) | Fine | Fine | Fine, non-uniform | Non-uniform | Non-uniform |
| General comment | Good MVT, poor flex | Good MVT, poor flex | Poor film | Poor film | Poor film | a solvent selected from the group consisting of N,N'-dimethylformamide, N,N'-dimethylacetamide and tetrahydrofuran — 500 – 1,000 on to a water permeable substrate at ambient temperatures, passing the coated substrate into a water bath to coagulate the surface film and extract the solvent and drying.

2. The method of claim 1 wherein said cement comprises in parts by weight polyvinyl chloride — 100
di-2-ethylhexyl azelate — 80
polyesterurethane — 60
dimethylformamide — 900.

* * * * *